(12) United States Patent
Sounik et al.

(10) Patent No.: US 7,834,113 B2
(45) Date of Patent: Nov. 16, 2010

(54) PHOTORESIST COMPOSITIONS AND PROCESSES FOR PREPARING THE SAME

(75) Inventors: James R. Sounik, Corpus Christi, TX (US); Frank Leonard Schadt, III, Wilmington, DE (US); Michael Fryd, Philadelphia, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 965 days.

(21) Appl. No.: 11/392,857

(22) Filed: Mar. 29, 2006

(65) Prior Publication Data

US 2006/0247400 A1    Nov. 2, 2006

Related U.S. Application Data

(63) Continuation-in-part of application No. 10/840,971, filed on May 7, 2004, now abandoned.

(60) Provisional application No. 60/468,774, filed on May 8, 2003.

(51) Int. Cl.
| | |
|---|---|
| C08F 4/04 | (2006.01) |
| C08F 2/00 | (2006.01) |
| C08F 118/02 | (2006.01) |
| C08F 12/02 | (2006.01) |

(52) U.S. Cl. .................. 526/218.1; 526/222; 526/319; 526/346

(58) Field of Classification Search .............. 526/218.1, 526/222, 319, 346
See application file for complete search history.

(56) References Cited

U.S. PATENT DOCUMENTS

| | | | |
|---|---|---|---|
| 4,491,628 A | 1/1985 | Ito et al. | |
| 4,679,843 A | 7/1987 | Spykerman | |
| 4,822,862 A | 4/1989 | Rupp et al. | |
| 4,898,916 A | 2/1990 | Gupta | |
| 4,912,173 A | 3/1990 | Keene et al. | |
| 4,931,379 A | 6/1990 | Brunsvold et al. | |
| 4,939,070 A | 7/1990 | Brunsvold et al. | |
| 4,962,147 A | 10/1990 | Vicari | |
| 5,087,772 A | 2/1992 | Sheehan et al. | |
| 5,239,015 A | 8/1993 | Sheehan et al. | |
| 5,284,930 A | 2/1994 | Matsumoto et al. | |
| 5,288,850 A | 2/1994 | Matsumoto et al. | |
| 5,304,610 A | 4/1994 | Bhattacharya et al. | |
| 5,625,007 A | 4/1997 | Sheehan et al. | |
| 5,625,020 A | 4/1997 | Breyta et al. | |
| 5,789,522 A | 8/1998 | Zampini et al. | |
| 5,939,511 A | 8/1999 | Zampini et al. | |
| 5,945,251 A | 8/1999 | Davidson | |
| 6,075,114 A * | 6/2000 | Umetsu et al. | ............... 528/272 |
| 6,414,110 B1 | 7/2002 | Sheehan et al. | |
| 6,787,611 B2 * | 9/2004 | Sheehan | ................... 525/327.4 |
| 2002/0156199 A1 | 10/2002 | Sheehan et al. | |

FOREIGN PATENT DOCUMENTS

| | | |
|---|---|---|
| EP | 0 813 113 A1 | 12/1997 |
| WO | WO 94/14858 A1 | 7/1994 |
| WO | WO 98/01478 * | 1/1998 |
| WO | WO 98/01478 A1 | 1/1998 |
| WO | WO 99/31144 A1 | 6/1999 |
| WO | WO 99/57163 A1 | 11/1999 |
| WO | WO 00/66575 A2 | 11/2000 |

OTHER PUBLICATIONS

Billmeyer, "Textbook of Polymer Science", John Wiley and Sons, Inc., p. 60-68, 1984.*
Nalamasu et. al., An Overview of Resist Processing for Deep UV Lithography, 3. Photopolymer Sci. Technol. 1991, vol. 4:299-318.
MacDonald et. al., Airborne Chemical Contamination of a Chemically Amplified Resist, SPIE, 1991, vol. 1466:2-12.

* cited by examiner

*Primary Examiner*—William K Cheung
(74) *Attorney, Agent, or Firm*—Konrad H. Kaeding

(57) ABSTRACT

The present invention relates to novel photoresist compositions and processes for preparing the same utilizing polymers having a low polydispersity via the use of certain chain transfer agents (CTA) with certain monomers to provide said polymers. The polymers incorporating the chain transfer agents can be homopolymers, or made with additional monomers to provide copolymers. These polymers/copolymers are then converted into photoresist compositions for use as such.

18 Claims, No Drawings

PHOTORESIST COMPOSITIONS AND PROCESSES FOR PREPARING THE SAME

BACKGROUND OF THE INVENTION

1. Field of the Invention

The present invention relates to novel photoresist compositions and processes for preparing the same utilizing polymers having a low polydispersity via the use of certain chain transfer agents (CTA) with certain monomers to provide said polymers. The polymers incorporating the chain transfer agents can be homopolymers, or made with additional monomers to provide copolymers. These polymers/copolymers are then converted into photoresist compositions for use as such.

2. Background

There is a desire in the industry for higher circuit density in microelectronic devices that are made using lithographic techniques. One method of increasing the number of components per chip is to decrease the minimum feature size on the chip, which requires higher lithographic resolutions. The use of shorter wavelength radiation (e.g., deep UV, 190 to 315 nm) than the currently employed mid-UV spectral range (e.g., 350 nm to 450 nm) offers the potential for higher resolution.

Several acid catalyzed chemically amplified resist compositions have been developed for use at short wavelengths, such as those disclosed in U.S. Pat. No. 4,491,628 and Nalamasu et al., "An Overview of Resist Processing for Deep UV Lithography," 3. Photopolymer Sci. Technol. 4, 299 (1991). The resist compositions generally comprise a photosensitive acid generator and an acid sensitive polymer. The polymer has acid sensitive side chain (pendant) groups that are bonded to the polymer backbone and are reactive towards a proton.

Although chemically amplified resist compositions generally have suitable lithographic sensitivity, in certain applications, their performance can be improved by (i) increasing their thermal stability in terms of thermal decomposition and plastic flow and (ii) increasing their stability in the presence of airborne chemical contaminants.

U.S. Pat. Nos. 4,939,070 and 4,931,379 disclose chemically amplified, acid sensitive resist compositions having increased thermal stability in the post image development stage. Although these resists have suitable thermal stability, they also have lower sensitivity and therefore are unsuitable in certain applications.

MacDonald et al. SPIE 14662 (1991) reported that due to the catalytic nature of the imaging mechanisms, chemically amplified resist systems are sensitive toward minute amounts of airborne chemical contaminants such as basic organic substances. In order to protect the resist from such airborne contaminants, the air surrounding the coated film is carefully filtered to remove such substances. Alternatively, the resist film is overcoated with a protective polymer layer. However, these are cumbersome processes.

U.S. Pat. No. 5,625,020 discloses an acid sensitive, chemically amplified photoresist composition having high thermal stability and stability in the presence of airborne chemical contaminants for use in semiconductor manufacturing. This photosensitive resist composition comprises (i) a photosensitive acid generator and (ii) a polymer comprising hydroxystyrene and acrylate, methacrylate or a mixture of acrylate and methacrylate. The resist has high lithographic sensitivity and high thermal stability. The resist also exhibits surprising stability in the presence of airborne chemical contaminants. However, the disclosed process of preparing the polymer results in poor conversion rates and chemical cleavage of some groups in the repeat units. Thus, there is a need for an improved process for preparing the polymers used in the photoresist compositions.

U.S. Pat. No. 4,898,916 discloses a process for the preparation of poly(vinylphenol) from poly(acetoxystyrene) by acid catalyzed transesterification.

U.S. Pat. No. 5,239,015 discloses a process for preparing low optical density polymers and co-polymers for photoresists and optical applications.

U.S. Pat. No. 5,625,007 discloses a process for making low optical polymers and co-polymers for photoresists and optical applications.

U.S. Pat. No. 5,625,020 discloses a process for making a photoresist composition containing a photosensitive acid generator and a polymer comprising the reaction product of hydroxystyrene with acrylate, methacrylate or a mixture of acrylate and methacrylate.

EP 0813113 Al, Barclay, discloses an aqueous transesterification to deprotect the protected polymer.

WO 94 14858 A discloses polymerizing hydroxystyrene without the protecting group.

WO 98 01478 discloses chain transfer agents used to control the polydispersity of certain polymers.

WO 99 31144 discloses chain transfer agents used to control the polydispersity of certain polymers.

Other patents of interest are U.S. Pat. Nos. 4,679,843; 4,822,862; 4,912,173; 4,962,147; 5,087,772; 5,304,610; 5,789,522; 5,939,511; and 5,945,251.

All of the references described herein are incorporated herein by reference in their entirety.

SUMMARY

One embodiment of this invention is a process for the preparation of polymers such as homo-, co-, and terpolymers of (1) p-hydroxystyrene (PHS) or substituted p-hydroxystyrene (SPHS) alone or in combination with acrylates (AA) and/or other monomers capable of being polymerized using RAFT chain transfer agents. This process yields a polymer having enhanced purity and a low polydispersity.

In one embodiment, the process of this invention provides a substantially pure homopolymer of p-hydroxystyrene (PHS). Other embodiments provide substantially pure copolymers of p-hydroxystyrene and tert-butyl acrylate, or terpolymers of p-hydroxystyrene, tert-butyl acrylate and styrene. These hydroxyl containing polymers have a wide variety of applications, including as photoresists in the microelectronics industry.

DETAILED DESCRIPTION OF THE INVENTION

One embodiment of this invention is a process comprising:
a. polymerizing a substituted styrene monomer of formula I,

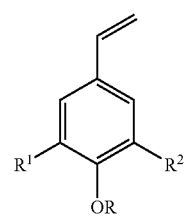

in the presence of a solvent, a chain transfer agent, and a free radical initiator to form a reaction mixture comprising a substituted styrene polymer, wherein the weight ratio of monomer to solvent is about 1:1 to about 2:1; and wherein R is —C(O)R$^5$ or —R$^5$; and R$^1$ and R$^2$ are the same or different and independently selected from a group consisting of H, F, Cl, Br, C$_1$-C$_4$ alkyl, C$_1$-C$_4$ fluoroalkyl, phenyl and tolyl; and R$^5$ is C$_1$-C$_5$ alkyl, either straight chain or branched.

One product of this reaction is typically a substituted styrene polymer that contains a CTA-derived end group, —SC(S)X. Depending on the intended application for the polymer, the end group can be left in place or removed (vide infra).

In one embodiment of this invention, the process further comprises removing unreacted monomer and/or low molecular weight polymer to provide a partially purified substituted styrene.

In one embodiment of this invention, the process further comprises reacting the substituted styrene polymer with an alcohol in the presence of a catalyst to form a hydroxystyrene polymer.

In one embodiment of this invention, the process further comprises contacting a solution of the hydroxystyrene polymer with an ion-exchange polymer.

In one embodiment of this invention, the process further comprises removing the unreacted monomer and low molecular weight polymer by a "slurry wash," in which a second solvent is added to a solution of the polymer, wherein the high molecular weight portion of the polymer is partially or substantially insoluble in the second solvent. Adding the second solvent causes the high molecular weight portion of the polymer to precipitate, leaving the monomer(s) and other low molecular weight material in solution. Removing this solution leaves an insoluble polymer portion that has a higher Mw and a lower polydispersity. The precipitated polymer can be rinsed with additional second solvent to further increase polymer purity. Suitable second solvents include water, heptanes, hexanes, toluene, or mixtures of solvents such as water and acetone, or water and methanol.

Alternatively, in a so-called "reverse precipitation step," the precipitated polymer can be re-dissolved in a solvent, followed by additional cycles of precipitation, solvent removal, and dissolution steps.

The "slurry wash" and "reverse precipitation" steps have the same objective (to remove low molecular weight material) and can often be used interchangeably. The slurry wash tends to be more convenient because reverse precipitation often requires heat to re-dissolve the polymer. But reverse precipitation tends to work well with a wider variety of polymers, even those that precipitate into hard masses or those that entrap large quantities of the surrounding media when they precipitate.

In one embodiment of this invention, the process further comprises isolating the hydroxystyrene polymer. This can be accomplished by any of several means, such as distilling off the solvent or precipitating the polymer by contacting a polymer solution with a nonsolvent. For example, pouring a methanol solution of polyhydroxystyrene into water will precipitate the polymer, which can then be isolated by filtration, rinsed with additional water and dried.

By "nonsolvent" is meant a solvent in which the desired polymer is substantially insoluble, but the monomer(s), oligomers and other low molecular weight materials are appreciably soluble.

In one embodiment of this invention, the process further comprises a solvent swap. In a solvent swap, a second solvent is added to a solution of a polymer and a first solvent, wherein the first solvent has a lower boiling point than the second solvent. The first solvent is then partially or completely removed by distillation, leaving the polymer dissolved in the second solvent. This is a convenient way to change solvents without having to first isolate the polymer as a solid.

In one embodiment of this invention, the process further comprises removing the chain transfer agent derived end group from the polymer prior to reacting the polymer with a catalyst in the presence of an alcohol solvent to form a hydroxystyrene polymer. Removal of the chain transfer derived end group typically comprises reacting a polymer containing a chain transfer agent derived end group, —SC(S)X (where X is R', OR', N(R')$_2$, SR', or P(O)(OR')$_2$), with a salt of hypophosphorous acid, M$^+$H$_2$PO$_2^-$, and a radical initiator. In this step, the —SC(S)X end group is replaced by —H. Suitable salts of hypophosphorous acid include salts in which the cation is a protonated nitrogen base or tetra-alkyl ammonium. Suitable radical initiators include peroxides and azo compounds.

In one embodiment of this invention, the monomer is 4-acetoxystyrene and the hydroxystyrene polymer comprises repeat units derived from 4-hydroxystyrene. In one embodiment, the hydroxystyrene polymer is a homopolymer of 4-hydroxystyrene.

In one embodiment of this invention, the polymerization is conducted in the presence of one or more additional monomers to form co-polymers or terpolymers.

Suitable additional monomers include acrylates of formula II

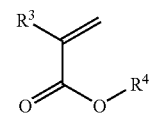

wherein

R$^3$ is selected from a group consisting of hydrogen, methyl, ethyl, n-propyl, iso-propyl, n-butyl, i-butyl or t-butyl; and R$^4$ is selected from a group consisting of methyl, ethyl, n-propyl, i-propyl, n-butyl, i-butyl, t-butyl, t-amyl, benzyl, cyclohexyl, 9-anthracenyl, 2-hydroxyethyl, cinnamyl, adamantyl, methyl adamantyl, ethyl adamantyl, isobornyl, 2-ethoxyethyl, n-heptyl, n-hexyl, 2-hydroxypropyl, 2-ethylbutyl, 2-methoxypropyl, 2-(2-methoxyethoxyl), oxotetrahydrofuran, hydroxytrimethylpropyl, oxo-oxatricyclononyl, 2-naphthyl, 2-phenylethyl, and phenyl.

More specifically, suitable additional monomers include methyl adamantyl acrylate; methyl adamantyl methacrylate; ethyl adamantyl acrylate; ethyl adamantyl methacrylate; ethyl tricyclodecanyl acrylate; ethyl tricyclodecanyl methacrylate; propyl adamantyl methacrylate; methoxybutyl adamantyl methacrylate; methoxylbutyl adamantyl acrylate; isobornylacrylate; isobornylmethacrylate; cyclohexylacrylate; cyclohexylmethacrylate; 2-methyl-2-adamantyl methacrylate; 2-ethyl-2-adamantyl methacrylate; 3-hydroxy-1-adamantyl methacrylate; 3-hydroxy-1-adamantyl acrylate; 2-methyl-2-adamantyl acrylate; 2-ethyl-2-adamantyl acrylate; 2-hydroxy-1,1,2-trimethylpropyl acrylate; 5-oxo-4-oxatricyclo-non-2-yl acrylate; 2-hydroxy-1,1,2-trimethylpropyl 2-methacrylate; 2-methyl-2-adamantyl 2-methacrylate; 2-ethyl-2-adamantyl 2-methacrylate; 5-oxotetrahydrofuran-3-yl acrylate; 3-hydroxy-1-adamantyl 2-methylacrylate;

5-oxotetrahydrofuran-3-yl 2-methylacrylate; 5-oxo-4-oxatricyclo-non-2-yl 2 methylacrylate; monodecyl maleate; 2-hydroxy ethyl methacrylate; isodecyl methacrylate; hydroxylpropyl methacrylate; isobutyl methacrylate; lauryl methacrylate; hydroxylpropyl acrylate; methyl acrylate; t-butylaminoethyl methacrylate; isocyanatoethyl methacrylate; tributyltin methacrylate; sulfoethyl methacrylate; 1-butoxyethyl methacrylate; t-butyl methacrylate; 2-phenoxy ethyl methacrylate; 2-phenoxy ethyl acrylate; 2-ethoxy ethoxy ethyl acrylate; acetoacetoxyethyl methacrylate; □-carboxyethyl acrylate; maleic anhydride; methyl methacrylate; styrene; ethyl acrylate; 2-ethyl hexylmethacrylate; 2-ethyl hexyl acrylate; glycidyl methacrylate; n-butyl acrylate; acrolein; 2-diethylaminoethyl methacrylate; allyl methacrylate; vinyl oxazoline ester of tall oil; acrylonitrile; methacrylic acid; stearyl methacrylate; meso-methacrylate; itaconic acid; acrylic acid; n-butyl methacrylate; ethyl methacrylate; hydroxy ethyl acrylate; acrylamide; styrene; 4-methylstyrene; styrene alkoxide, wherein the alkyl portion is $C_1$-$C_5$ straight or branch chain; dialkyl maleate and dialkyl fumarate, wherein the alkyl has 1 to 4 carbon atoms; and vinyl chloride.

Co-polymers having repeat units derived from hydroxystyrene and one or more of the above acrylate monomers can be made by the processes of the present invention. Terpolymers contain repeat units derived from hydroxystyrene and at least two other monomers.

The chain transfer agents (CTA) are used with the styrene monomer and any other monomer mentioned herein. These CTA are a thiocarbonylthio compound selected from:

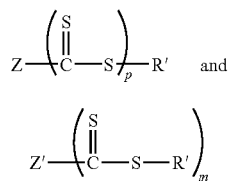

having a chain transfer constant greater than about 0.1; and wherein:

Z is selected from a group consisting of H, Cl, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—O$_2$CR"), optionally substituted carbamoyl (—CONR"$_2$), cyano (—CN), dialkyl- or diaryl-phosphonato [—P(=O)(OR")$_2$], dialkyl- or diaryl-phosphinato [—P(=O)R"$_2$], and a polymer chain formed by any mechanism;

Z' is an m-valent moiety derived from a member of a group consisting of optionally substituted alkyl, optionally substituted aryl and a polymer chain; where the connecting moieties are selected from a group that consists of aliphatic carbon, aromatic carbon, and sulfur;

R' is selected from a group consisting of optionally substituted alkyl; an optionally substituted saturated, unsaturated or aromatic carbocycle or heterocycle; optionally substituted alkylthio; optionally substituted alkoxy; optionally substituted dialkylamino; an organometallic species; and a polymer chain prepared by any polymerization mechanism;

R" is selected from a group consisting of optionally substituted alkyl and optionally substituted saturated, unsaturated or aromatic carbocycle;

p is 1 or an integer greater than 1; and m is an integer $\geq$ 2.

In compounds C and D, R'. (i.e., the radical of R') is a free-radical leaving group that initiates free radical polymerization.

Some chain transfer agents useful in the processes of this invention include:

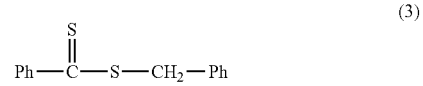

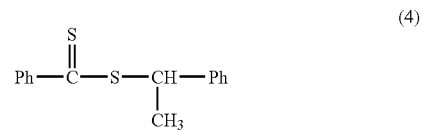

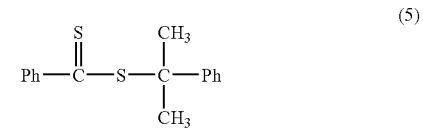

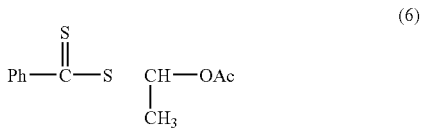

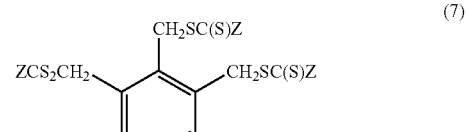

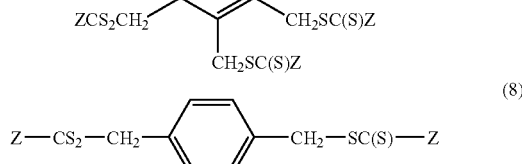

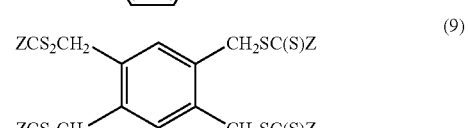

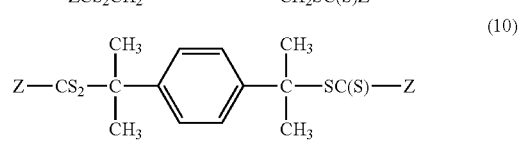

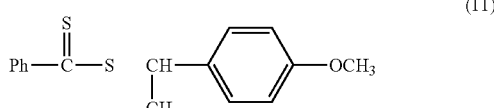

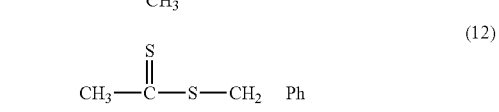

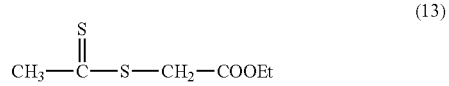

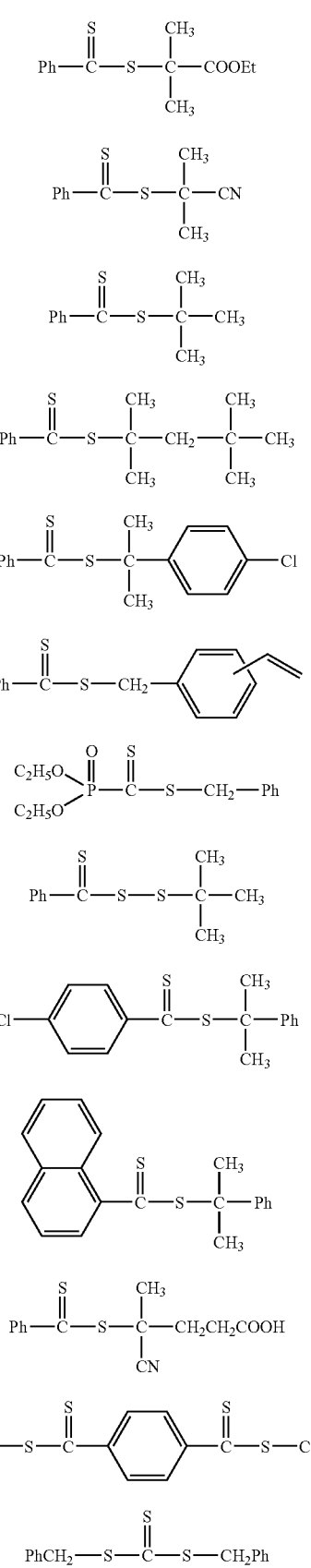

(14)
(15)
(16)
(17)
(18)
(19)
(20)
(21)
(22)
(23)
(24)
(25)
(26)

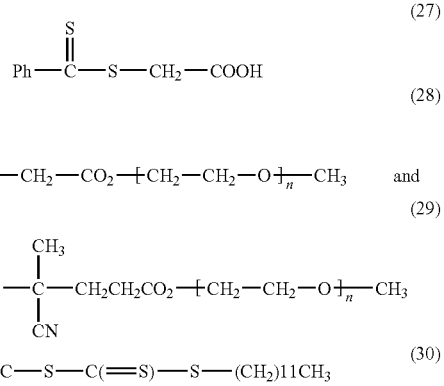

(27)
(28)
(29)
(30)

wherein Z is phenyl, and n is 1-22.

The polymerization solvent is typically a high-boiling solvent, for example, 1-methoxy-2-propanol or propylene glycol methyl ether acetate. The reaction mixture can also comprise solvents or co-solvents selected from a group consisting of toluene, dimethylaminopyridine, tetrahydrofuran, methyl ethyl ketone, acetone, and 1,4-dioxane.

Suitable free radical initiators include 2,2'-azobis(2,4-dimethylpentanenitrile); 2,2'-azobis(2-methylpropanenitrile); 2,2'-azobis(2-methylbutanenitrile); 1,1'-azobis(cyclohexanecarbonitrile); t-butyl peroxy-2-ethylhexanoate; t-butyl peroxypivalate; t-amyl peroxypivalate; di-isononanoyl peroxide; decanoyl peroxide; succinic acid peroxide; di(n-propyl) peroxydicarbonate; di(sec-butyl)peroxydicarbonate; di(2-ethylhexyl)peroxydicarbonate; t-butylperoxyneodecanoate; 2,5-dimethyl-2,5-di(2-ethylhexanoylperoxy)hexane; t-amylperoxyneodecanoate; dimethyl 2,2'-azobisisobutyrate, and combinations thereof.

In one embodiment, the initiator is selected from the group consisting of 2,2'-azobis(2,4-dimethylpentanenitrile); 2,2'-azobis(2-methylpropanenitrile); 2,2'-azobis(2-methylbutanenitrile); 1,1'-azobis(cyclohexanecarbonitrile); t-butyl peroxy-2-ethylhexanoate; t-butyl peroxypivalate; t-amyl peroxypivalate, and combinations thereof.

The amount of initiator is any amount that accomplishes the desired end result. Typically, the initiator is present to about three mole percent based upon the total moles of monomer.

The polymerization conditions are any temperature and pressure that will produce the desired end result. In general, the temperatures are from about 90° C. to about 140° C., preferably from about 95° C. to about 120° C. The pressure may be atmospheric, sub-atmospheric or super-atmospheric. The polymerization time is not critical, but generally will take place over a period of at least one minute in order to produce a polymer of corresponding composition.

Surprisingly, it has been found that conducting the polymerization at relatively high solids loading (monomer to solvent ratio of 1:1 to 2:1) leads to a polymer with lower polydispersity. While not wishing to be bound by theory, it is believed that these process conditions suppress the formation of high molecular weigh polymer "dimers," thus disfavoring the formation of a bimodal distribution of polymer chain lengths.

After the polymerization, and prior to reacting the polymer with an alcohol in the presence of a catalyst to form a hydroxystyrene polymer, the crude polymer mixture from the polymerization step is subjected to a purification procedure wherein low molecular weight material is removed. In one instance, this purification is achieved by adding a nonsolvent to the polymer solution to precipitate at least a portion of the polymer, predominantly the higher molecular weight portion. A substantial portion of the solvent mixture, including the low molecular weight material and/or unreacted monomer, is removed by suction, centrifugation, filtration, decantation or similar means. The remaining solid material can be washed one or more times with nonsolvent to remove additional monomer and/or low molecular weight material. This purification step is illustrated below in Examples 3 and 4.

Alternatively, after the first portion of monomer and/or low molecular weight material is removed, the solid that is left can be re-dissolved using a suitable solvent, optionally assisted by heating the mixture. Addition of a fresh portion of nonsolvent and optional cooling will again precipitate the higher molecular weight material and leave lower molecular weight material in solution. These dissolution and precipitation steps can be repeated until no further purification is identified, as for example, until a small sample of the decanted solvent, upon evaporation to dryness shows substantially no residue. This fractionation process is generally carried out 2 to 10 times, i.e., heating, cooling, separating, and solvent replacement. It is illustrated in Example 2 below.

One of the important measures of the degree of purity of the crude polymer produced from the polymerization of the monomers is the polydispersity value. In general, it is desirable to have a low value, for example, between 1 and 3, preferably between 1 and 2, indicative of a polymer product that is uniform in chain length. The purification step removes low molecular weight polymers and unreacted monomers, and thus tends to lower the polydispersity of the remaining polymer. Polydispersity is the ratio of weight average molecular weight (Mw) to the number average molecular weight (Mn), as determined by Gel Permeation Chromatography (GPC).

In the step of reacting the polymer with an alcohol in the presence of a catalyst to form a hydroxystyrene polymer, the —OR group on the styrenic units of the polymer are replaced with an —OH group. When R is —C(O)$R^5$, the catalyst is selected from a group consisting of anhydrous ammonia, lithium methoxide, lithium ethoxide, lithium isopropoxide, sodium methoxide, sodium ethoxide, sodium isopropoxide, potassium methoxide, potassium ethoxide, potassium isopropoxide, cesium methoxide, cesium ethoxide, cesium isopropoxide, and combinations thereof, wherein the alkoxide anion is similar to the alcohol solvent. Suitable catalysts also include alkali metal hydroxides such as lithium hydroxide, sodium hydroxide, potassium hydroxide, cesium hydroxide and combinations thereof.

When R is —C(O)$R^5$, the temperature of the —OR removal step is such that by-product ester formed can be continually removed from the reaction mixture. Typically, the temperature is from about 50° C. to about 200° C. In a preferred embodiment, the reaction is carried out at the reflux temperature of the alcohol solvent.

When R is $R^5$, then the catalyst is a strong acid such as mineral acids such as HCl.

The amount of catalyst employed is from about 0.1 mole percent to about 2 mole percent of monomer I present in the composition of the polymer.

If the polymer is to be used in a photoresist, it is desirable to remove the catalyst. This can be accomplished by contacting a solution of the polymer with a cation-exchange resin, preferably an acidic cation exchange resin such as a sulfonated styrene/divinylbenzene cation exchange resin in its hydrogen-form. Suitable acidic exchange resins are available from Rohm and Haas Company, e.g., AMBERLYST® 15 acidic ion exchange resin. As sold, these AMBERLYST® resins typically contain as much as 80,000 to 200,000 ppb of sodium and iron. Before being used in the process of the invention, the ion exchange resin should be treated with water and then a mineral acid solution. Then the ion exchange resin should be rinsed with a solvent that is the same as, or at least compatible with, the polymer solution solvent, typically an alcohol solvent. This procedure is similar to procedures disclosed in U.S. Pat. Nos. 5,284,930 and 5,288,850, which are hereby incorporated by reference.

After contacting the polymer solution with an ion-exchange resin, the polymer can be isolated by precipitation in water, rinsed and then dried.

Alternatively, the purified polymer solution can be solvent-exchanged with an aprotic solvent which is a photoresist compatible solvent, removing the alcohol solvent by distillation. This aprotic solvent comprises at least one member selected from a group consisting of glycol ethers, glycol ether acetates and aliphatic esters. Suitable photoresist compatible solvents include glycol ether acetates such as ethylene glycol monoethyl ether acetate and propylene glycol monomethyl ether acetate (PGMEA), and esters such as ethyl-3-ethoxypropionate, methyl-3-methoxypropionate. PGMEA is preferred. These solvents may be used alone or as mixtures.

Other suitable photoresist solvents include butyl acetate, amyl acetate, cyclohexyl acetate, 3-methoxybutyl acetate, methyl ethyl ketone, methyl amyl ketone, cyclohexanone, cyclopentanone, 3-ethoxyethyl propionate, 3-ethoxymethyl propionate, 3-methoxymethyl propionate, methyl acetoacetate, ethyl acetoacetate, diacetone alcohol, methyl pyruvate, ethyl pyruvate, propylene glycol monomethyl ether, propylene glycol monoethyl ether, propylene glycol monomethyl ether propionate, propylene glycol monoethyl ether propionate, ethylene glycol monomethyl ether, ethylene glycol monoethyl ether, diethylene glycol monomethyl ether, diethylene glycol monoethyl ether, 3-methyl-3-methoxybutanol, N-methylpyrrolidone, dimethylsulfoxide, γ-butyrolactone, propylene glycol methyl ether acetate, propylene glycol ethyl ether acetate, propylene glycol propyl ether acetate, methyl lactate, ethyl lactate, propyl lactate, and tetramethylene sulfone. Of these, the propylene glycol alkyl ether acetates and alkyl lactates are especially preferred. The solvents may be used alone or as mixtures. An exemplary useful solvent mixture is a mixture of propylene glycol alkyl ether acetate and an alkyl lactate. It is noted that the alkyl groups of the propylene glycol alkyl ether acetates are preferably those of 1 to 4 carbon atoms, for example, methyl, ethyl and propyl, with methyl and ethyl being especially preferred. Since the propylene glycol alkyl ether acetates include 1,2- and 1,3-substituted ones, each includes three isomers depending on the combination of substituted positions, which may be used alone or in admixture. It is also noted that the alkyl groups of the alkyl lactates are preferably those of 1 to 4 carbon atoms, for example, methyl, ethyl and propyl, with methyl and ethyl being especially preferred.

When the propylene glycol alkyl ether acetate is used as the solvent, it preferably accounts for at least 50% by weight of the entire solvent. Also when the alkyl lactate is used as the solvent, it preferably accounts for at least 50% by weight of the entire solvent. When a mixture of propylene glycol alkyl ether acetate and alkyl lactate is used as the solvent, that mixture preferably accounts for at least 50% by weight of the entire solvent. In this solvent mixture, it is further preferred that the propylene glycol alkyl ether acetate is 60 to 95% by weight and the alkyl lactate is 40 to 5% by weight.

Usually the solvent is used in amounts of about 300 to 2,000 parts, preferably about 400 to 1,000 parts by weight per 100 parts by weight of the solids in the positive photoresist composition. The concentration is not limited to this range as long as film formation by existing methods is possible.

In one embodiment of this invention, the process further comprises reacting the hydroxystyrene polymer in the photoresist-compatible solvent with a vinyl ether compound or a dialkyl carbonate in the presence of a catalyst to form a photoresist polymer.

When the hydroxystyrene polymer is reacted with a vinyl ether, an acid catalyst is used and the product is an acetal derivatized hydroxyl containing polymer. The vinyl ethers suitable for use as a protective group include those falling within the formula

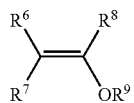

wherein $R^6$, $R^7$ and $R^8$ independently represent a hydrogen atom or a straight-chain, branched, cyclic or heterocyclic alkyl group containing 1 to 6 carbon atoms, and $R_9$ represents a straight-chain, branched, cyclic or heterocyclic alkyl or aralkyl group containing 1 to 10 carbon atoms which may be substituted with a halogen atom, an alkoxy group, aralkyl oxycarbonyl group, or an alkyl carbonyl amino group.

Suitable vinyl ether compounds include methyl vinyl ether, ethyl vinyl ether, n-butyl vinyl ether, t-butyl vinyl ether, 2-chloro-ethyl vinyl ether, 1-methoxyethyl vinyl ether, 1-benzyloxyethyl vinyl ether, isopropenyl methyl ether, and isopropenyl ethyl ether.

Suitable cyclic vinyl ethers include 3,4-dihydro-2H-pyran, and suitable divinyl ethers include butanediol-1,4-divinyl ether, ethylene glycol divinyl ether, and triethylene glycol divinyl ether.

These vinyl ether compounds can be used alone or in combination thereof. The vinyl ether compounds in total are used preferably in a ratio of 0.1 to 0.7 mol equivalents to the phenolic hydroxyl of the polymer.

The acetalization is followed by treatment with base to neutralize the acid. Suitable bases include ammonia, organic amines such as triethylamine, n-hexylamine, dodecylamine, aniline, dimethylaniline, diphenylamine, triphenylamine, diazabicyclooctane, diazabicycloundecane and dicyclohexyl methylamine; ammonium hydroxides represented by tetramethylammonium hydroxide (TMAH) and tetrabutylammonium hydroxide; sulfonium hydroxides represented by triphenylsulfonium hydroxide; iodonium hydroxides represented by diphenyliodonium hydroxide; triphenylsulfonium acetate; triphenylsulfonium camphanate; triphenylsulfonium camphorate; triphenylsulfonium hydroxide; triphenylsulfonium phenolate; tris-(4-methylphenyl)sulfonium hydroxide; tris-(4-methylphenyl)sulfonium acetate; tris-(4-methylphenyl) sulfonium phenolate; diphenyliodonium acetate; diphenyliodonium phenolate; bis-(4-tert-butylphenyl)iodonium hydroxide; bis-(4-tert-butylphenyl)iodonium acetate; bis-(4-tert-butylpheny)iodonium phenolate; and basic heterocyclic compounds such as 3-phenylpyridine, 4-phenylpyridine, lutidine and 2,6-di-tert-butylpyridine.

Inactivating the acid catalyst by use of the base improves the storage stability of the polymer. Theoretically, addition of the base in an equivalent amount to the acid is sufficient to inactivate the acid, but because storage stability can be further secured by adding about 10% excess base, addition of about 1.1 equivalents of the base to 1 equivalent of the acid is preferable. This excess base will be taken into consideration in order to determine the amount of another base added as an additive for preparing the resist.

It is also feasible in this neutralization step to use an ion exchange material as previously mentioned herein before.

To prevent the decomposition of the vinyl ether, the water content should be less than about 5,000 ppm, preferably less than about 1,000 ppm. Typical reaction temperatures and reaction times are 0-25° C. and 2-6 hours, respectively.

When the polymer is reacted with a dialkyl dicarbonate, a base catalyst is used. Suitable base include those listed above. Suitable dialkyl dicarbonates include di-tert-butyl dicarbonate. The amount of the dialkyl dicarbonate used is preferably 0.1 to 0.7 mol equivalent to the phenolic hydroxyl of the polymer.

If the resist materials to be synthesized are used as a component of a resist composition exposed with e.g., KrF excimer laser radiation, it is preferable to use a catalyst showing no absorption at 248 nm, i.e., the exposure wavelength of KrF excimer laser. Accordingly, when an acid is used as the reaction catalyst, the acid has no aromatic groups. Examples of acids which can be used as the reaction catalyst in the present invention include mineral acids such as hydrochloric acid, sulfuric acid, organic sulfonic acids such as methanesulfonic acid, camphorsulfonic acid, or halocarboxylic acids such as trifluoroacetic acid, and trichloroacetic acid. The amount of the acid used is preferably 0.1 to 10 mmol equivalents to the hydroxyl group of the polymer.

In the case where (+/−) camphorsulfonic acid is used as the reaction catalyst and the solvent is propylene glycol monomethyl ether acetate, the solution of (+/−) camphorsulfonic acid in propylene gycol monomethyl ether acetate should be prepared just before use.

In the present invention, at least one vinyl ether compound and at least one dialkyl dicarbonate can be used simultaneously for protection of hydroxy-styrene polymers. If such a polymer is protected by both a vinyl ether compound and a dialkyl dicarbonate, usually the polymer is subjected to protection reaction with the vinyl ether compound in the presence of an acid catalyst and then subjected to protection reaction with the dialkyl dicarbonate in the presence of a base catalyst.

The resist composition can be prepared without isolating the photoresist polymer by directly adding to the solution of the photoresist polymer and the photoresist-compatible solvent, a photoacid generator and, if necessary, a base and additives for improvement of optical and mechanical characteristics, film-forming properties, and adhesion to the substrate. The viscosity of the composition can be regulated by addition of solvent, if necessary. The solvent used in preparing the resist composition is any solvent which is conventionally used in preparation of a resist composition. Further, any photoacid-generating compounds and other additives, which are used conventionally in chemically amplified resists, can also be used. The total solid content in the resist composition is preferably in the range of 9% to 50% by weight, more preferably 15% to 25% by weight.

The photoacid generator is a compound capable of generating an acid upon exposure to high energy radiation. Preferred photoacid generators include sulfonium salts, iodonium salts, sulfonyldiazomethanes, and N-sulfonyloxyimides. These photoacid generators are illustrated below while they may be used atone or in admixture of two or more.

Sulfonium salts are salts of sulfonium cations with sulfonates. Exemplary sulfonium cations include triphenylsulfonium, (4-t-butoxy-phenyl)diphenylsulfonium, bis(4-t-butoxy-phenyl)phenyl-sulfonium, tris(4-t-butoxyphenyl)sulfonium, (3-t-butoxyphenyl)diphenyl-sulfonium, bis(3-t-butoxyphenyl)phenylsulfonium, tris(3-t-butoxy-phenyl)sulfonium, (3,4-di-t-butoxyphenyl)diphenylsulfonium, bis(3,4-di-t-butoxyphenyl)phenyl-sulfonium, tris(3,4-di-t-butoxyphenyl)sulfonium, diphenyl(4-thiophenoxyphenyl)sulfonium, (4-t-butoxycarbonyl-methyloxyphenyl)-diphenylsulfonium, tris(4-t-butoxycarbonylmethyloxyphenyl)sulfonium, (4-t-butoxyphenyl)bis(4-dimethylaminophenyl)sulfonium, tris(4-dimethylaminophenyl)sulfonium, 2-naphthyldiphenylsulfonium, dimethyl-2-naphthylsulfonium, 4-hydroxyphenyldimethylsulfonium, 4-methoxyphenyl-dimethylsulfonium, trimethylsulfonium, 2-oxocyclohexylcyclohexyl-methylsulfonium, trinaphthylsulfonium, and tribenzylsulfonium. Exemplary sulfonates include trifluoromethanesulfonate, nonafluorobutanesulfonate, heptadecafluorooctanesulfonate, 2,2,2-trifluorooethanesulfonate, pentafluorobenzenesulfonate, 4-trifluoromethylbenzenesulfonate, 4-fluorobenzenesulfonate, toluenesulfonate, benzenesulfonate, 4,4-toluenesulfonyloxybenzenesulfonate, naphthalenesulfonate, camphorsulfonate, octanesulfonate, dodecylbenzenesulfonate, butanesulfonate, and methanesulfonate. Sulfonium salts based on combination of the foregoing examples are included.

Iodonium salts are salts of iodonium cations with sulfonates. Exemplary iodonium cations are aryliodonium cations including diphenyliodonium, bis(4-t-butylphenyl)iodonium, 4-t-butoxyphenyl-phenyliodonium, and 4-methoxyphenylphenylodonium.

Exemplary sulfonyldiazomethane compounds include bis-sulfonyldiazomethane compounds and sulfonylcarbonyldiazomethane compounds such as bis(ethylsulfonyl)diazomethane, bis(1-methylpropyl-sulfonyl)diazomethane, bis(2-methylpropylsulfonyl)diazomethane, bis(1,1-dimethylethylsulfonyl)diazomethane, bis(cyclohexylsulfonyl)diazo-methane, bis(perfluoroisopropylsulfonyl)diazomethane, bis(phenylsulfonyl)diazomethane, bis(4-methylphenylsulfonyl)diazomethane, bis(2,4-dimethylphenylsulfonyl)diazomethane, bis(2-naphthylsulfonyl)-diazomethane, 4-methylphenylsulfonylbenzoyldiazomethane, t-butyl-carbonyl-4-methylphenylsulfonyldiazomethane 2-naphthylsulfonyl-benzoyldiazomethane, 4-methylphenyl-sulfonyl-2-naphthoyldiazo-methane, methylsulfonylbenzoyldiazomethane, and t-butoxycarbonyl-4-methylphenylsulfonyldiazomethane.

N-sulfonyloxyimide photoacid generators include combinations of imide skeletons with sulfonates. Exemplary imide skeletons are succinimide, naphthalene dicarboxylic acid imide, phthalimide, cyclohexyldicarboxylic acid imide, 5-norbornene-2,3-dicarboxylic acid imide, and 7-oxabicyclo[2,2,1]-5-heptene-2,3-dicarboxylic acid imide. Exemplary sulfonates include trifluoromethanesulfonate, nonafluorobutanesulfonate, heptadecafluorooctanesulfonate, 2,2,2-trifluoro-ethanesulfonate, pentafluorobenzenesulfonate, 4-trifluoromethyl-benzenesulfonate, 4-fluorobenzenesulfonate, toluenesulfonate, benzenesulfonate, naphthalenesulfonate, camphorsulfonate, octanesulfonate, dodecylbenzenesulfonate, butanesulfonate, and methanesulfonate, Benzoinsulfonate photoacid generators include benzoin tosylate, benzoin mesylate, and benzoin butanesulfonate.

Pyrogallol trisulfonate photoacid generators include pyrogallol, fluoroglycine, catechol, resorcinol, hydroquinone, in which all the hydroxyl groups are replaced by trifluoromethanesulfonate, nonafluorobutane-sulfonate, heptadecafluorooctanesulfonate, 2,2,2-trifluoroethanesulfonate, pentafluorobenzenesulfonate, 4-trifluoromethylbenzenesulfonate, 4-fluorobenzenesulfonate, toluenesulfonate, benzenesulfonate, naphthalenesulfonate, camphorsulfonate, octanesulfonate, dodecyl-benzenesulfonate, butanesulfonate, and methanesulfonate.

Nitrobenzyl sulfonate photoacid generators include 2,4-dinitrobenzyl sulfonate, 2-nitrobenzyl sulfonate, and 2,6-dinitrobenzyl sulfonate. Also useful are analogous nitrobenzyl sulfonate compounds in which the nitro group on the benzyl side is replaced by a trifluoromethyl group.

Sulfone photoacid generators include bis(phenylsulfonyl)methane, bis(4-methylphenylsulfonyl)methane, bis(2-naphthylsulfonyl)methane, 2,2-bis(phenylsulfonyl)propane, 2,2-bis(4-methylphenylsulfonyl)propane, 2,2-bis(2-naphthylsulfonyl)propane, 2-methyl-2-(p-toluenesulfonyl)propio-phenone, 2-cyclohexylcarbonyl-2-(p-toluenesulfonyl)propane, and 2,4-dimethyl-2-(p-toluenesulfonyl)pentan-3-one.

Photoacid generators in the form of glyoxime derivatives include bis-o-(p-toluenesulfonyl)-α-dimethylglyoxime, bis-o-(p-toluenesulfonyl)-α-diphenylglyoxime, bis-o-(p-toluenesulfonyl)-α-dicyclohexylglyoxime, bis-o-(p-toluenesulfonyl)-2,3-pentanedioneglyoxime, bis-o-(p-toluenesulfonyl)-2-methyl-3,4-pentanedioneglyoxime, bis-o-(n-butanesulfonyl)-α-dimethyl-glyoxime, bis-o-(n-butanesulfonyl)-α-diphenylglyoxime, bis-o-(n-butanesulfonyl)-α-dicyclohexylglyoxime, bis-o-(n-butanesulfonyl)-2,3-pentane-dioneglyoxime, bis-o-(n-butanesulfonyl)-2-methyl-3,4-pentanedione-glyoxime, bis-o-(methanesulfonyl)-α-dimethylglyoxime, bis-o-(trifluoromethanesulfonyl)-α-dimethylglyoxime, bis-o-(1,1,1-trifluoroethane-sulfonyl)-α-dimethylglyoxime, bis-o-(tert-butanesulfonyl)-α-dimethyl-glyoxime, bis-o-(perfluorooctanesulfonyl)-α-dimethylglyoxime, bis-o-(cyclohexylsulfonyl)-α-dimethylglyoxime, bis-o-(benzenesulfonyl)-α-dimethylglyoxime, bis-o-(p-fluorobenzenesulfonyl)-α-dimethylglyoxime, bis-o-(p-tert-butylbenzenesulfonyl)-α-dimethylglyoxime, bis-o-(xylenesulfonyl)-α-dimethylglyoxime, and bis-o-(camphorsulfonyl)-α-dimethyl-glyoxime.

Of these photoacid generators, the sulfonium salts, bissulfonyldiazomethane compounds, and N-sulfonyloxyimide compounds are preferred.

While the anion of the optimum acid to be generated differs depending on the ease of scission of acid labile groups introduced in the polymer, an anion which is nonvolatile and not extremely diffusive is generally chosen. The preferred anions include benzenesulfonic acid anions, toluenesulfonic acid anions, 4,4-toluenesulfonyloxybenzene-sulfonic acid anions, pentafluorobenzenesulfonic acid anions, 2,2,2-trifluoroethanesulfonic acid anions, nonafluorobutanesulfonic acid anions, heptadecafluorooctanesulfonic acid anions, and camphorsulfonic acid anions.

In the chemically amplified positive resist composition, an appropriate amount of the photoacid generator is 0 to 20 parts, and especially 1 to 10 parts by weight per 100 parts by weight of the solids in the composition. The photoacid generators may be used alone or in a mixture of two or more. The transmittance of the resist film can be controlled by using a photoacid generator having a low transmittance at the exposure wavelength and adjusting the amount of the photoacid generator added.

In conjunction with the all steps set forth above, it is critical that all steps be conducted on an anhydrous basis, i.e., wherein the water level is less than about 5,000 parts per million (ppm), in order to avoid possible side reactions.

Various dissolution inhibitors can be added to photoresists derived from the copolymers of this invention. Ideally, dissolution inhibitors (DIs) for deep UV resists (e.g., 248 nm resists) should be designed/chosen to satisfy multiple materials needs including dissolution inhibition, plasma etch resistance, and adhesion behavior of resist compositions comprising a given DI additive. Some dissolution inhibiting compounds also serve as plasticizers in resist compositions. Several suitable dissolution inhibitors are disclosed in WO 00/66575.

Photoresists of this invention can contain additional optional components. Examples of optional components include, but are not limited to, resolution enhancers, adhesion promoters, residue reducers, coating aids, plasticizers, and $T_g$ (glass transition temperature) modifiers.

In addition to their use in photoresist applications, the styrene polymers prepared by embodiments of this invention may be used to increase the adhesion of polyester tire cord to a rubber matrix; as an anti-corrosion layer in aluminum and steel applications; to separate protein from DNA serums; to improve the adhesion of nail polish to protein-containing materials such as fingernails or toenails; to improve the oxygen barrier properties of films, sheets or containers; as ion-exchange resins; as the stationary phase for liquid chromatography applications; to modify epoxy resins; and to improve the stain resistance of polyester fibers.

EXAMPLES

In the Examples that follow, the following abbreviations are used:
ASM—p-Acetoxystyrene monomer
t-BPP—tert-butyl peroxypivalate
THF—Tetrahydrofuran
GPC—Gel permeation chromatography
GC—Gas chromatography
FTIR—Fourier transform infrared spectroscopy
NMR—Nuclear magnetic resonance spectroscopy, for example, of proton ($^1$H) and/or carbon-13 ($^{13}$C) nuclei.
DSC—Differential scanning calorimetry
UV-Vis—Ultraviolet-Visible Spectroscopy General Analytical Techniques Used for the Characterization: Analytical techniques used to characterize the polymers of the present invention include:
NMR: $^1$H and $^{13}$C NMR spectra were recorded on a Bruker 400 MHz spectrometer with 5 mm probes at 400 and 100 MHz, respectively.
GPC: GPC was performed on a Waters gel permeation chromatograph equipped with refractive index detection.
GC: GC analysis was performed on a Hewlett Packard Model 5890 series II gas chromatograph equipped with a DB-1 column.
FTIR: FTIR was recorded on a Mattson Genesis Series FTIR.
DSC: A Perkin Elmer 7700 DSC was used to determine the $T_g$ (glass transition temperature) of the co- and terpolymers of this invention. The heating rate was maintained at 10° C./min, generally, over a temperature range of 50° C. to 400° C. The flow rate of nitrogen or air is maintained at 20 mL/min.
UV-Vis of samples were taken using a Hewlett Packard Vectra 486/33VL UV-Vis spectrophotometer.

Example 1

Low polydispersity polymers using RAFT.
Homopolymers of 4-hydroxystyrene

Polymerization

To a four neck, 1 liter round bottom flask, fitted with a condenser, mechanical stirrer, nitrogen inlet, and thermowell, 4-acetoxystyrene (ASM) (250.33 g, 1.5204 moles) and 1-methoxy-2-propanol (PGME) (269.4 g) were added. The reactor was heated to 100° C. using a heating mantle and temperature controller. Then, S-cyanomethyl-S-dodecyl trithiocarbonate (CDTC) (2.66 g, 0.83 mmoles) and t-butylperoxyacetate (tBPA) (0.214 g, 75 wt % in OMS, 0.12 mmoles) dissolved in 28.1 g of PGME were added. The reactor was maintained at 100° C. for 24.0 hours. The reactor was then cooled to room temperature. Analysis of the polymer obtained showed a weight average molecular weight of 14,400 and a polydispersity of 1.114, table 1.

Isolation

To 546 g of the polymer solution obtained above, 283 g of PGME was added to adjust the concentration of the polymer to 30 wt %. The solid polymer was then isolated by precipitation into methanol (10:1, methanol:polymer solution), filtered through a coarse fit, washed with methanol, and vacuum dried (55° C. 20 torr, 24 hours). 116.5 g of a light yellow solid was obtained.

Deprotection/Isolation

To a four neck, 1 liter round bottom flask, fitted with a condenser/Barrett receiver, mechanical stirrer, nitrogen inlet, and thermowell, 111.34 g of the solid obtained above, methanol (218.66 g), and sodium methoxide in methanol (25 wt % in methanol, 1.02 g) were added. The reactor was heated to reflux and was maintained at reflux for 6 hours with continuous take off of distillate. The distillate was replaced to the reactor continuously with methanol through out the reaction. The reactor was then cooled to room temperature. The solution obtained was passed through a column of Amberylst A15 resin (1"×11", 10 mL/min) to remove the catalyst. The solid polymer was then isolated by precipitation into water (10:1, water:polymer solution), filtered through a coarse frit. washed with water, and vacuum dried (55° C., 20 torr, 3 days). 75.35 g of a fine white solid was obtained (91.4% yield. 41.3% overall yield). Analysis of the solid gave a weight average molecular weight of 12,820 with a polydispersity of 1.198. Thermal, molecular weight. and optical density information is given in table 2.

TABLE 1

Conversion and GPC results
10033-153
ASM Conversion

| Sample | Time (mins) | Conc. (wt %) | Conversion | GPC Peak 2 Mw | PD |
| --- | --- | --- | --- | --- | --- |
| 10033-153-1 | 0.0 | 45.00 | 0.00% | 152 | |
| 10033-153-2 | 118 | 43.93 | 2.38% | 3,388 | 1.200 |
| 10033-153-3 | 1060 | 28.72 | 36.18% | 12,264 | 1.122 |
| 10033-153-4 | 1443 | 24.89 | 44.69% | 14,400 | 1.114 |

TABLE 2

Analysis of 10033-153

| Parameter | Result |
| --- | --- |
| UVTransperency | 143 L/M cm |
| $T_g$ | 176.5° C. |
| $M_w$ | 12,820 |
| $M_n$ | 10,699 |
| Polydispersity | 1.198 |

Example 2

Homopolymers of 4-acetoxystyrene
Reaction 10033-161
Polymerization

To a four neck, 1 liter round bottom flask, fitted with a condenser, mechanical stirrer, nitrogen inlet, and thermowell, 4-acetoxystyrene (ASM) (250.56 g, 1.5205 moles) and 1-methoxy-2-propanol (PGME) (273.5 g) were added. The reactor was heated to 100° C. using a heating mantle and temperature controller. Then, S-cyanomethyl-S-dodecyl trithiocarbonate (CDTC) (2.63 g, 0.83 mmoles) and 1,1-di(t-butylperoxy)-3,3,5-trimethylcyclohexane (TMCH) (0.56 g, 0.18 mmoles) dissolved in 20.7 g of PGME were added. The reactor was maintained at 100° C. for 26.4 hours. The reactor was then cooled to room temperature. Analysis of the polymer solution obtained showed a weight average molecular weight of 23,036 and a polydispersity of 1.294, table 3. Conversion of ASM to polymer was analyzed by gas chromatography to be 83.12%.

TABLE 3

Conversion and GPC results for 10033-161
10033-161
ASM Conversion

| | Time | Conc. | | Molecular Weight | |
| --- | --- | --- | --- | --- | --- |
| Sample | (mins) | (wt %) | Conversion | Mw | PD |
| | 0.0 | 45.00 | 0.00% | 152 | |
| 10033-161-1 | 185 | 26.72 | 40.63% | 11,017 | 1.180 |
| 10033-161-2 | 1100 | 9.23 | 79.49% | 21,905 | 1.418 |
| 10033-161-3 | 1580 | 7.60 | 83.12% | 23,036 | 1.294 |

Example 3

Copolymer of 4-hydroxystyrene and styrene
Reaction 10033-177,
Polymerization

To a four neck, 1 liter round bottom flask, fitted with a condenser, mechanical stirrer, nitrogen inlet, and thermowell, 4-acetoxystyrene (ASM) (212.50 g, 1.29 moles), styrene (23.86 g, 0.23 moles). propylene glycol methyl ether acetate (PGMEA) (273.09 g), S-cyanomethyl-S-dodecyl trithiocarbonate (CDTC) (7.05 g, 2.22 mmoles), and 1,1-di(t-butylperoxy)-3,3,5-trimethylcyclohexane (TMCH) (1.46 g, 0.48 mmoles) were added. The reactor was heated to 100° C. using a heating mantle and temperature controller. The reactor was maintained at 100° C. for 25.8 hours. The reactor was then cooled to room temperature. Analysis of the polymer obtained showed a weight average molecular weight of 10,782 and a polydispersity of 1.205, table 4. Conversion of ASM was 98.02% and styrene 95.43%.

Purification

The above product was purified using reverse precipitation using methanol as a non-solvent. To the stirred reactor, methanol was slowly added (351.0 g) until a thick solid was formed. The stirrer was stopped and the solids were allowed to settle for a period of 30 minutes. Then, 418.8 g of the top solution layer was removed by suction. To the resulting solids, PGMEA (67.9.1 g) was added and the mixture was stirred until the solids were completely dissolved. Again, to the stirred reactor, methanol was slowly added (190.9 g) until a thick solid was formed. The stirrer was stopped and the solids were allowed to settle for a period of 30 minutes. Then, 221.2 g of the top solution layer was removed by suction. To the resulting solids, PGMEA (87.2 g) was added and the mixture was stirred until the solids were completely dissolved. Finally, to the stirred reactor, methanol was slowly added (174.4 g) until a thick solid was formed. The stirrer was stopped and the solids were allowed to settle for a period of 30 minutes. Then, 344.5 g of the top solution layer was removed by suction. To the resulting solids, methanol (326.1 g) was added to adjust the solids content to 30 wt %.

Deprotection/Isolation

To the above reactor, fitted with a condenser/Barrett receiver, mechanical stirrer, nitrogen inlet, and thermowell, sodium methoxide in methanol (25 wt % in methanol, 1.98 g) was added. The reactor was heated to reflux and was maintained at reflux for 4.3 hours with continuous take off of distillate. The distillate was replaced to the reactor continuously with methanol through out the reaction. The reactor was then cooled to room temperature. The solution obtained was passed through a column of Amberylst A15 resin (1"×11", 8 mL/mm) to remove the catalyst. The solid polymer was then isolated by precipitation into water (10:1. water:polymer solution), filtered through a coarse frit, washed with water, and vacuum dried (55° C., 20 torr, 3 days). 159.9 g of a fine white solid was obtained (88.2% overall yield). Analysis of the solid gave a weight average molecular weight of 10,051 with a polydispersity of 1.210.

TABLE 4

Conversion and GPC results for 10033-177
10033-177
ASM:Styrene Conversion

| | | ASM | | Styrene | | | |
| --- | --- | --- | --- | --- | --- | --- | --- |
| | Time | Conc. | | Conc. | | GPC | |
| Sample | (mins) | (wt %) | Conversion | (wt %) | Conversion | Mw | PD |
| | 0.0 | 40.42 | 0.00% | 4.60 | 0.00% | 152 | |
| 10033-177 | 76 | 24.81 | 38.62% | 4.09 | 11.09% | 3,552 | 1.157 |
| 10033-177 | 236 | 10.82 | 73.23% | 2.54 | 44.78% | 6,892 | 1.156 |

TABLE 4-continued

Conversion and GPC results for 10033-177
10033-177
ASM:Styrene Conversion

| Sample | Time (mins) | ASM Conc. (wt %) | ASM Conversion | Styrene Conc. (wt %) | Styrene Conversion | GPC Mw | GPC PD |
|---|---|---|---|---|---|---|---|
| 10033-177 | 1227 | 0.85 | 97.90% | 0.23 | 95.00% | 10,626 | 1.204 |
| 10033-177 | 1529 | 0.80 | 98.02% | 0.21 | 95.43% | 10,782 | 1.205 |

Example 4

Homopolymer of 4-Hydroxystyrene

To a four neck, 22 liter glass round bottom flask, fitted with a chilled water reflux condenser, mechanical stirrer, nitrogen inlet, and thermowell, 4-acetoxystyrene (4000.0 g, 28.83 moles), propylene glycol mono methyl ether (PGME) (2200.0 g), RAFT agent, $C_{12}H_{25}SC(S)SCH_2CN$ (80.2 g, 0.2523 moles), 1,1-di(t-butylperoxy)-3,3,5-trimethyl cyclohexane (TMCH) (7.2 g, 0.0238 moles), and 2,2'-azobis(2,4-dimethylvaleronitrile) (5.9 g, 0.237 moles) were added. The reactor was heated to 115° C. using an electric heating mantle and temperature controller over a period of 1 hr. The reactor was then maintained at 115° C. for 11.0 hr, with a charge of 1.8 g of TMCH added at 1 hr after reaching 115° C. The reactor was then cooled to room temperature.

Analysis by gas chromatography of the polymer solution showed the conversion of 4-acetoxystyrene to be 92.1%. Analysis of the polymer obtained by gel permeation chromatography gave a weight average molecular weight of 13,362, with a polydispersity of 1.14.

The reactor was heated to and maintained at 35 to 40° C. To the stirred reactor, methanol was slowly added (5180 g) until a thick solid was formed. The stirrer was stopped and the solids were allowed to settle for 30 min. Then, 2783 g of the top solution layer was removed by suction. To the resulting solids, methanol (3835 g) was added and mixture was stirred for 15 min. The stirrer was stopped and the solids were allowed to settle for 30 min. Then, 4430 g of the top solution layer was removed by suction. To the resulting solids, methanol (3755 g) was added and the mixture was stirred for 15 min. The stirrer was stopped and the solids were allowed to settle for 30 min. Then, 4438 g of the top solution layer was removed by suction. Finally, PGME (1110 g) was added to the stirred reactor to dissolve the solids.

The reactor was fitted with an overhead condenser/receiver. The reactor was heated to 100° C. under vacuum (200 torr) and the residual methanol was collected overhead until the level of methanol remaining in the reactor was below 0.5 wt %. The reactor was then cooled to room temperature.

The reactor was fitted with a reflux condenser. Triethylamine hypophosphite (126.2 g) and TMCH (7.2 g) were added and the reactor was then heated to 100° C. over a period of 1 hr and maintained at 100° C. for a total of 9 hr. Four charges of TMCH (1.8 g) were added every two hr during this process. The mixture was then cooled to room temperature.

The reactor was heated to and maintained at 35 to 40° C. To the stirred reactor, methanol was slowly added (4016 g) until a thick solid was formed. The stirrer was stopped and the solids were allowed to settle for 30 min. Then, 2586 g of the top solution layer was removed by suction. To the resulting solids, methanol (3204 g) was added and mixture was stirred for 15 min. The stirrer was stopped and the solids were allowed to settle for 30 min. Then, 3494 g of the top solution layer was removed by suction. To the resulting solids, methanol (3565 g) was added and the mixture was stirred for 15 min. The stirrer was stopped and the solids were allowed to settle for 30 min. Then, 4341 g of the top solution layer was removed by suction. The reactor was then cooled to room temperature.

The reactor was fitted with an overhead condenser/receiver and 2896 g of methanol and 66.5 g of 25 wt % sodium methoxide in methanol were added. The reactor was heated to reflux (67° C.) and was maintained at reflux for a total of 9 hr. During this time, 1100 g of overhead was removed. The solution was cooled to room temperature and 3200 g of methanol were added.

The residual catalyst was removed by passing the polymer solution through a mixed column (2"×24") of AMBERLYST®A21 and AMBERLITE®200CT (30:70 mixture) ion exchange resin at 40 mL/min.

The polymer solution was precipitated into water (10:1, water:solution) and the solid was isolated by filtration. The solid was washed with water (3 times at equal volumes) and was vacuum dried (60° C., 15 torr) for four days. A fine white solid was obtained (2314 g, 66.5% yield). Analysis of the polymer obtained by gel permeation chromatography gave a weight average molecular weight of 13,600, with a polydispersity of 1.13.

Example 5

Terpolymer of 4-Hydroxystyrene, Styrene, and t-Butylacrylate

To a four neck, 1 liter glass round bottom flask, fitted with a chilled water reflux condenser, mechanical stirrer, nitrogen inlet, and thermowell, 4-acetoxystyrene (150.02 g, 0.6351 moles), styrene ((24.07 g, 0.2311 moles), t-butylacrylate (48.98 g, 0.3821 moles), propylene glycol mono methyl ether (150.45 g), RAFT agent, $C_{12}H_{25}SC(S)SCH_2CN$ (2.67 g, 0.0084 moles), and 1,1-di(t-butylperoxy)-3,3,5-trimethyl cyclohexane (0.50 g, 0.0017 moles) were added. The reactor was heated to 100° C. using an electric heating mantle and a temperature controller over a period of 1 hr. The reactor was maintained at 100° C. for 10.0 hr and then cooled to room temperature.

To the reactor, triethylamine hypophosphite (4.22 g) and TMCH (2.07 g) were added. The reactor was then heated to 100° C. over a period of 1 hr and then maintained at 100° C. for a total of 5 hr. The mixture was then cooled to room temperature.

The reactor was heated to and maintained at 35 to 40° C. To the stirred reactor, methanol was slowly added (429.9 g) until a thick solid was formed. The stirrer was stopped and the solids were allowed to settle for 30 min. Then, 316.8 g of the top solution layer was removed by suction. To the resulting solids, methanol (316.2 g) was added and mixture was stirred for 15 min. The stirrer was stopped and the solids were allowed to settle for 30 min. Then, 348.0 g of the top solution layer was removed by suction. To the resulting solids, methanol (358.0 g) was added and the mixture was stirred for 15 min. The stirrer was stopped and the solids were allowed to settle for 30 min. Then, 408.5 g of the top solution layer was removed by suction. To the resulting solids, methanol (425.8 g) was added and the mixture was stirred for 15 min. The stirrer was stopped and the solids were allowed to settle for 30 min. Then, 354.3 g of the top solution layer was removed by suction. The reactor was then cooled to room temperature.

The reactor was fitted with an overhead condenser/receiver and 236.9 g of methanol and 2.04 g of 25 wt % sodium methoxide in methanol was added. The reactor was heated to reflux (67° C.) and was maintained at reflux for a total of 3.5 hr. During this time, 51.8 g of overhead was removed. Then, 52.3 g of methanol was added to the reactor and the solution was allowed to cool to room temperature.

The residual catalyst was removed by passing the polymer solution through a mixed column (1"×9") of AMBERLYST® A21 and AMBERLITE® 200CT (40:60 mixture) ion exchange resin at 8 mL/min.

The polymer solution was precipitated into water (10:1, water:solution) and the solid was isolated by filtration. The solid was washed with water (3 times at equal volumes) and was vacuum dried (55° C., 15 torr) for four days. A fine white solid was obtained (143.3 g, 78.3% yield). Analysis of the polymer obtained by gel permeation chromatography gave a weight average molecular weight of 26,021, with a polydispersity of 1.17.

While specific reaction conditions, reactants, and equipment are described above to enable one skilled in the art to practice the invention, one skilled in the art will be able to make modifications and adjustments which are obvious extensions of the present inventions. Such obvious extensions of or equivalents to the present invention are intended to be within the scope of the present inventions, as demonstrated by the claims which follow.

What is claimed is:

1. A process consisting essentially of:
   (a) polymerizing a substituted styrene monomer of formula I,

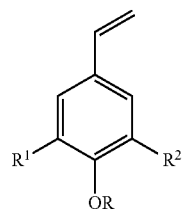

in the presence of a solvent, a chain transfer agent, and a free radical initiator to form a reaction mixture comprising substituted styrene polymer containing chain transfer derived end groups, wherein the weight ratio of monomer to solvent is about 1:1 to about 2:1; and wherein:

R is —C(O)R$^5$ or —R$^5$; and

R$^1$ and R$^2$ are the same or different and independently selected from a group consisting of H, F, Cl, Br, C$_1$-C$_4$ alkyl, C$_1$-C$_4$ fluoroalkyl, phenyl and tolyl; and R$^5$ is C$_1$-C$_5$ alkyl, either straight chain or branched (b) removing unreacted monomer from the reaction mixture, and (c) reacting the substituted styrene polymer with a radical initiator and a salt of hypophosphorous acid to form a second reaction mixture.

2. The process of claim 1, wherein the radical initiator is selected from a group consisting of peroxides and azo compounds.

3. The process of claim 1, wherein the salt of hypophosphorous acid is selected from a group consisting of salts comprising a protonated nitrogen base or a tetra-alkyl ammonium cation.

4. The process of claim 1, further consisting essentially of separating the substituted styrene polymer from the second reaction mixture.

5. The process of claim 4, further consisting essentially of reacting the substituted styrene polymer with an alcohol in the presence of a catalyst to provide a hydroxystyrene polymer.

6. The process of claim 5, wherein the catalyst is selected from a group consisting of anhydrous ammonia; lithium hydroxide, sodium hydroxide, potassium hydroxide, cesium hydroxide and combinations thereof; and lithium methoxide, lithium ethoxide, lithium isopropoxide, sodium methoxide, sodium ethoxide, sodium isopropoxide, potassium methoxide, potassium ethoxide, potassium isopropoxide, cesium methoxide, cesium ethoxide, cesium isopropoxide, and combinations thereof, wherein the alkoxide anion is similar to the alcohol.

7. The process of claim 6, wherein the catalyst is selected from a group consisting of HCl, sulfuric acid, trifluoroacetic acid, oxalic acid, and camphorsulfonic acid.

8. The process of claim 5, further consisting essentially of contacting a solution of the hydroxystyrene polymer with an ion-exchange polymer.

9. The process of claim 8, further consisting essentially of isolating the hydroxystyrene polymer.

10. The process of claim 8, further consisting essentially of a solvent swap.

11. The process of claim 9, further consisting essentially of reacting the hydroxystyrene polymer with a vinyl ether in the presence of an acid catalyst to form an acetal derivatized polymer.

12. The process of claim 9, further consisting essentially of reacting the hydroxystyrene polymer with a vinyl ether in the presence of an acid catalyst to form an acetal derivatized polymer.

13. The process of claim 1, wherein the polymerization is conducted in the presence of one or more additional monomers and the polymer formed is a co-polymer or terpolymer.

14. The process of claim 13, wherein the additional monomer is an acrylate of formula II:

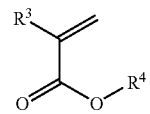

Wherein:
R$^3$ is selected from a group consisting of hydrogen, methyl, ethyl, n-propyl, iso-propyl, n-butyl, i-butyl or t-butyl; and R$^4$ is selected from a group consisting of methyl, ethyl, n-propyl, propyl, n-butyl, i-butyl, t-butyl, t-amyl, benzyl, cyclohexyl, 9-anthracenyl, 2-hydroxyethyl, cinnamyl, adamantyl, methyl adamantyl, ethyl adamantyl, isobomyl, 2-ethoxyethyl, n-heptyl, n-hexyl, 2-hydroxypropyl, 2-ethylbutyl, 2-methoxypropyl, 2-(2-methoxyethoxyl), oxotetrahydrofuran, hydroxytrimethylpropyl, oxo-oxatricyclononyl, 2-naphthyl, 2-phenylethyl, and phenyl.

15. The process of claim 13, wherein the additional monomer is selected from a group consisting of methyl adamantyl acrylate; methyl adamantyl methacrylate; ethyl adamantyl acrylate; ethyl adamantyl methacrylate; ethyl tricyclodecanyl acrylate; ethyl tricyclodecanyl methacrylate; propyl adamantyl methacrylate; methoxybutyl adamantyl methacrylate; methoxylbutyl adamantyl acrylate; isobornylacrylate; isobornylmethacrylate; cyclohexylacrylate; cyclohexylmethacrylate; 2-methyl-2-adamantyl methacrylate; 2-ethyl-2-adamantyl methacrylate; 3-hydroxy-1-adamantyl methacrylate; 3-hydroxy-1-adamantyl acrylate; 2-methyl-2-adamantyl acrylate; 2-ethyl-2-adamantyl acrylate; 2-hydroxy-1,1, 2-trimethylpropyl acrylate; 5-oxo-4-oxatricyclo-non-2-yl acrylate; 2-hydroxy-1, 1,2-trimethylpropyl 2-methacrylate; 2-methyl-adamantyl 2-methacrylate; 2-ethyl-2-adamantyl 2-methacrylate; 5-oxotetrahydrofuran-3-yl acrylate; 3-hydroxy-1-adamantyl 2-methylacrylate; 5-oxotetrahydrofuran-3-yl 2-methylacrylate; 5-oxo-4-oxatricyclo-non-2-yl 2 methylacrylate; monodecyl maleate; 2-hydroxy ethyl methacrylate; isodecyl methacrylate; hydroxyl propyl methacrylate; isobutyl methacrylate; lauryl methacrylate; hydroxyl propyl acrylate; methyl acrylate; t-butylaminoethyl methacrylate; isocyanatoethyl methacrylate; tributyltin methacrylate; sulfoethyl methacrylate; 1-butoxyethyl methacrylate; t-butyl methacrylate; 2-phenoxy ethyl methacrylate; 2-phenoxy ethyl acrylate; 2-ethoxy ethoxy ethyl acrylate; acetoacetoxyethyl methacrylate; □-carboxyethyl acrylate; maleic anhydride; methyl methacrylate; styrene; ethyl acrylate; 2-ethyl hexylmethacrylate; 2-ethyl hexyl acrylate; glycidyl methacrylate; n-butyl acrylate; acrolein; 2-diethylaminoethyl methacrylate; allyl methacrylate; vinyl oxazoline ester of tall oil; acrylonitrile; methacrylic acid; stearyl methacrylate; meso-methacrylate; itaconic acid; acrylic acid; n-butyl methacrylate; ethyl methacrylate; hydroxy ethyl acrylate; acrylamide; styrene; 4-methylstyrene; styrene alkoxide, wherein the alkyl portion is $C_1$-$C_5$ straight or branch chain; dialkyl maleate and dialkyl fumarate, wherein the alkyl has 1 to 4 carbon atoms; and vinyl chloride.

16. The process of claim 1, wherein R is —C(O)CH$_3$, and the process further consists essentially of:
    a. removing unreacted monomer from the reaction mixture to form partially purified polymer solution;
    c. reacting the substituted styrene polymer of the partially purified polymer solution with a salt of hypophosphorous acid and a radical initiator to form a substituted styrene polymer substantially free of chain transfer agent derived end groups; and
    d. reacting the substituted styrene polymer with an alcohol in the presence of a catalyst to provide a hydroxystyrene polymer.

17. The process of claim 1, wherein the chain transfer agent is a thiocarbonylthio compound selected from a group consisting of:

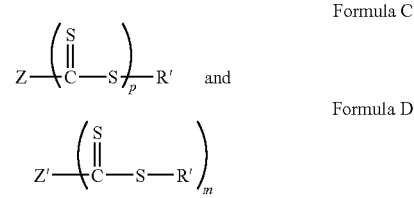

Formula C and Formula D having a chain transfer constant greater than about 0.1; and wherein:
    Z is selected from a group consisting of H, Cl, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—O$_2$CR"), optionally substituted carbamoyl (—CONR"$_2$), cyano (—CN), dialkyl- or diaryl-phosphonato [—P(═O)(OR")$_2$], dialkyl- or diaryl-phosphinato [—P(═O)R"$_2$], and a polymer chain formed by any mechanism;
    Z' is an m-valent moiety derived from a member of a group consisting of optionally substituted alkyl, optionally substituted aryl and a polymer chain; where the connecting moieties are selected from a group that consists of aliphatic carbon, aromatic carbon, and sulfur;
    R' is selected from a group consisting of optionally substituted alkyl; an optionally substituted saturated, unsaturated or aromatic carbocycle or heterocycle; optionally substituted alkylthio; optionally substituted alkoxy; optionally substituted dialkylamino; an organometallic species; and a polymer chain prepared by any polymerization mechanism;
    R" is selected from a group consisting of optionally substituted alkyl and optionally substituted saturated, unsaturated or aromatic carbocycle;
    p is 1 or an integer greater than 1; and
    m is an integer ≧2.

18. The process of claim 1, wherein the free radical initiator is selected from a group consisting of: 2,2'-azobis(2,4-dimethylpentanenitrile); 2,2'-azobis(2-methylpropanenitrile); 2,2'-azobis(2-methylbutanenitrile); 1,1'-azobis(cyclohexanecarbonitrile); t-butyl peroxy-2-ethylhexanoate; t-butyl peroxypivalate; t-amyl peroxypivalate; di-isononanoyl peroxide; decanoyl peroxide; succinic acid peroxide; di(n-propyl) peroxydicarbonate; di(sec-butyl) peroxydicarbonate; di(2-ethylhexl) peroxydicarbonate; t-butylperoxyneodecanoate; 2,5-dimethyl-2,5-di(2-ethylhexanoylperoxy)-hexane; t-amylperoxyneodecanoate; dimethyl 2,2'-azobisisobutyrate, and combinations thereof.

* * * * *